Figure 1:
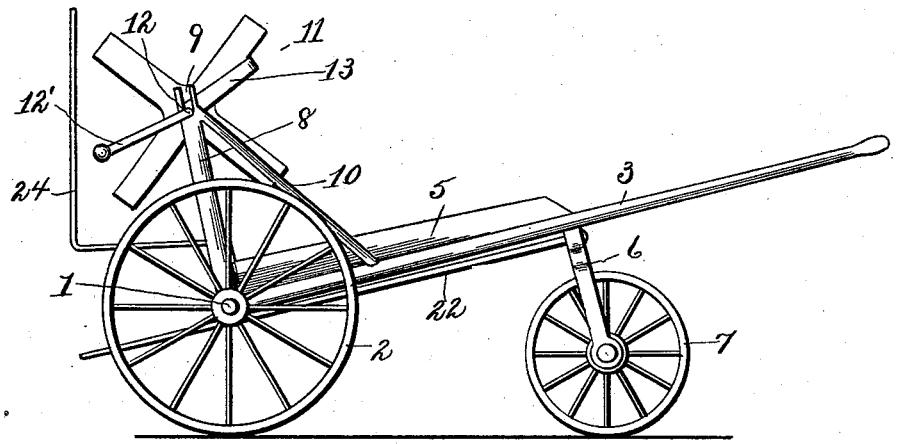

(No Model.)

W. E. GESLER.
REEL CARRIER.

No. 578,449. Patented Mar. 9, 1897.

WITNESSES
Wm DuVal Brown
Maud Schumacher

INVENTOR
Warner E. Gesler
By Carroll J. Webster
Atty.

UNITED STATES PATENT OFFICE.

WARNER E. GESLER, OF MACOMB, ILLINOIS.

REEL-CARRIER.

SPECIFICATION forming part of Letters Patent No. 578,449, dated March 9, 1897.

Application filed March 2, 1896. Renewed January 11, 1897. Serial No. 618,896. (No model.)

*To all whom it may concern:*

Be it known that I, WARNER E. GESLER, a citizen of the United States, residing at Macomb, in the county of McDonough and State of Illinois, have invented certain new and useful Improvements in Reel-Carriers; and I do hereby declare the following to be a full, clear, and exact description of the invention, such as will enable others skilled in the art to which it appertains to make and use the same.

My invention relates to a reel-carrier, and has especial reference to devices of this character for constructing wire fences, setting electric wires, &c., where it is desired to either unreel in constructing or reel in taking up the fence, electric wiring, &c.

The object of the invention is to provide a reel-carrier mounted so as to be guided by the operator automatically after being first set to move in the direction desired, with means for conveniently carrying the full reels or empty spools to and from the place of use, to be provided with appliances for reeling and unreeling both barbed wire and smooth wire by the use of an adjustable reel, so that the same may be changed as desired to be used with either kind of wire. With barbed wire the reel is so constructed that the ordinary wooden spool upon which the wire is wound can be placed on the reel-shaft and constitute a part of the reel. For smooth wire the reel is constructed as hereinafter set out.

With this object in view the invention consists in a frame having a platform mounted upon front wheels, and a rear wheel provided with projecting tongue adjustable in relation to the frame, whereby when set it retains its position and guides the carrier as desired without after manual manipulation.

The invention further consists in the parts and combination of parts as shown in the drawings, described in the specification, and pointed out in the claims.

Figure 2:
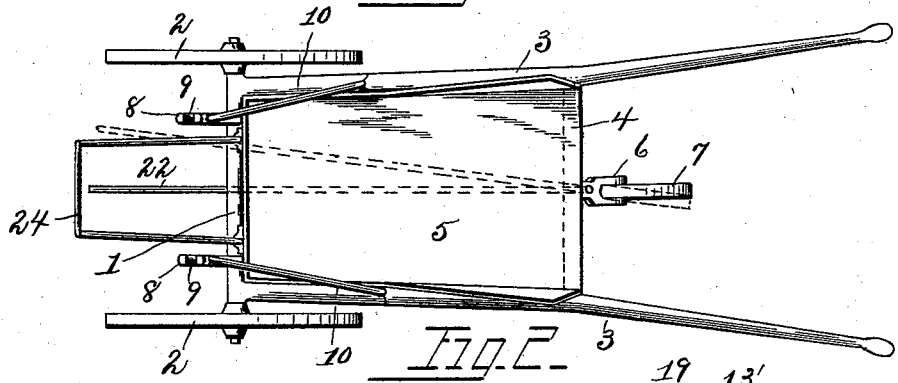
Figure 3:
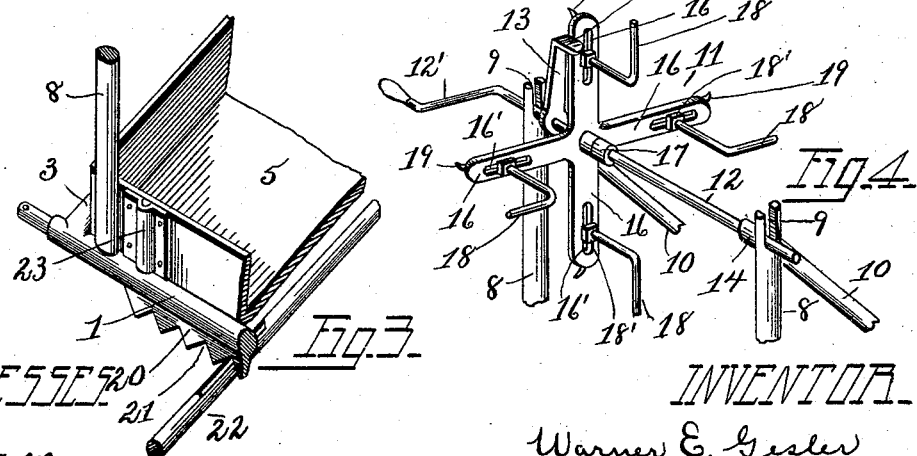
Figure 4:
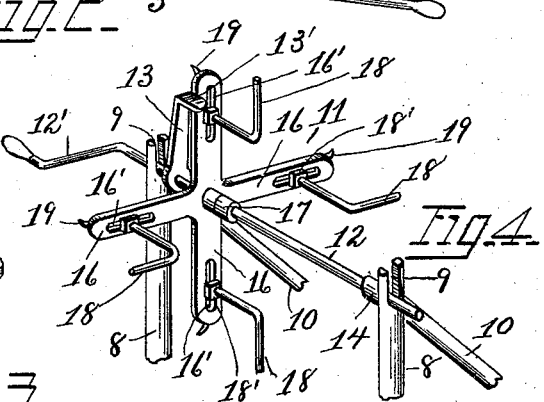

In the drawings, Figure 1 is a side elevation of the reel-carrier constructed in accordance with my invention. Fig. 2 is a plan view of the same with the reel-shaft and reel removed. Fig. 3 is a detail perspective view of a portion of the device, illustrating more particularly the front cross-piece, the serrations thereunder, and the connection of the guide-arm for the rear wheel therewith. This view also illustrates one of the sockets for the wire-guide. Fig. 4 is a detail view of the reel.

Like numerals of reference indicate corresponding parts throughout the several views.

1 designates the forward cross-piece or axle for the forward wheels 2, and extending rearward therefrom are handles 3, having a cross-piece 4 connecting the same, upon which, the front axle and the handles, is permanently secured a platform 5. Revolubly secured in the cross-piece 4, midway of the same, is an arm 6, bifurcated on its lower end, upon which the rear wheel 7 is journaled.

Thus far I have described that part of the carrier which is used as a barrow to carry the reels, coils, tools, &c., to and from the place of use.

Secured to the axle 1 and projecting upwardly therefrom are supports 8, having a bifurcated upper end 9, there being a brace 10 connecting the same and the handles, as shown, to assist in resisting strain exerted upon the supports.

11 designates the reel, which consists in a shaft 12, revolubly secured in the bifurcated end 9 of the arms 8 and held from longitudinal play by the angle-arm 13, secured upon the shaft near one end, and the washer 14, secured upon the opposite end, and the two bearing against the inner sides of the supports 8, respectively, as shown in Fig. 4, there being a handle 12' upon the shaft by which to revolve the same. Revolubly secured upon the shaft 12 is the reel, which is revolved by the contact of the angle end 13' of the arm 13, which abuts against one of the radial arms 16, the reel 11 proper being held in engagement with the arm by means of the washer 17, secured upon the shaft. Each arm 16 is slotted, as at 16', for a distance near its outer end, and secured therein are the reel-arms 18, held in an adjusted position by the nuts 18' upon one side and the handled nuts 19 upon the opposite side of the radial arms. By this construction if it is desired to remove a roll of wire after being wound upon the reel it is only necessary to loosen the handle-nuts 19 and turn the reel-arms 18, when the roll can be pulled off, the operation being the same to insert a roll upon the reel, the slots allowing the reel-arms to be adjusted to the different sizes of rolls.

Depending from the axle 1 is a flange 20, having a series of serrations 21, into which fits a spring-arm 22, secured to the arm 6, by which means the rear wheel is retained in any adjusted position. By this construction one operator can operate the device, as the machine can be previously set to travel any direction, it only being necessary for the operator to wind or unwind the reel, as the case may be.

23 designates sockets secured to the forward end of the platform, into which fit the ends of the reversible guide 24, it being readily understood that the guide can be placed either in front or in rear of the reel or be removed entirely for convenience in shipping.

It will thus be seen that I have provided a reel-carrier in which the parts coact to either reel or unreel the wire through the medium of a single operator and that is easily taken apart and put together, making it convenient for shipping.

What I claim is—

1. In a reel-carrier, a frame mounted upon front and rear wheels, a platform permanently secured to the frame, a serrated flange depending from the forward axle and a spring-arm secured to the rear wheel-support and coacting with the serrated flange to adjustably secure the rear wheel in any predetermined position.

2. In a reel-carrier, a frame mounted upon front and rear wheels, a platform secured upon the frame, a serrated flange depending from the front axle, a spring-arm secured to the rear wheel normally in engagement with the serrations of the flange, sockets secured upon the front end of the platform and a guide removably secured in the sockets, whereby it can be reversed or removed as desired.

In testimony whereof I affix my signature in presence of two witnesses.

WARNER E. GESLER.

Witnesses:
GEO. W. BUGG,
GEORGE D. TUNNICLIFF.